(12) United States Patent
Westwater

(10) Patent No.: US 6,239,811 B1
(45) Date of Patent: May 29, 2001

(54) METHOD AND APPARATUS TO MEASURE RELATIVE VISIBILITY OF TIME-VARYING DATA IN TRANSFORM SPACE

(76) Inventor: Raymond John Westwater, 475 Wall St., Princeton, NJ (US) 08540

( * ) Notice: Subject to any disclaimer, the term of this patent is extended or adjusted under 35 U.S.C. 154(b) by 0 days.

(21) Appl. No.: 09/187,489

(22) Filed: Nov. 6, 1998

Related U.S. Application Data

(60) Provisional application No. 60/064,389, filed on Nov. 7, 1997.

(51) Int. Cl.[7] .................................................... G06F 15/00
(52) U.S. Cl. ................................................................. 345/433
(58) Field of Search ................................. 345/418, 419, 345/433, 117, 121

(56) References Cited

U.S. PATENT DOCUMENTS 5,202,960 * 4/1993 Seiler .................................... 345/443
5,381,522 * 1/1995 Seto et al. ............................ 345/443

* cited by examiner

Primary Examiner—Phu K. Nguyen
(74) Attorney, Agent, or Firm—Norman Friedland

(57) ABSTRACT

A display device displays the effects of variations in the level of an individual parameter within a matrix of transformed parameters of a type which is processed through an inverse transform to form a video signal. A signal representing the single parameter, with other parameters set to zero, is scaled using differing constants to form a left intermediate signal and a right intermediate signal, each of which is processed through an inverse transform to form video data, which is then displayed on a left and right display screen. The images on the two screen are compared by a human user to determine whether there is a difference between the images as viewed through human eyes.

17 Claims, 3 Drawing Sheets

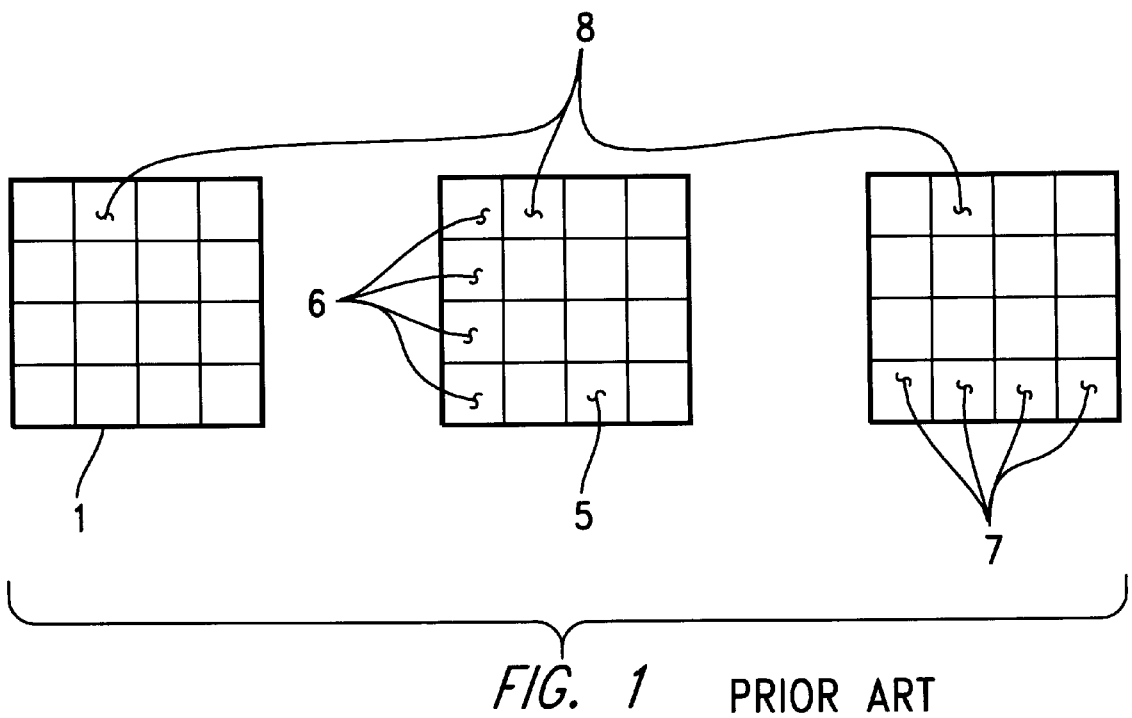

METHOD AND APPARATUS TO MEASURE RELATIVE VISIBILITY OF TIME-VARYING DATA IN TRANSFORM SPACE

This application claims benefit of a prior filed U.S. provisional application, serial No. Ser. 60/064,389, filed Nov. 7, 1997.

FIELD OF INVENTION

The present invention is related to measuring the relative visibility of time-varying data in transform space, and, more particularly, to displaying the effects of variations in the level of a parameter in transform space from which a video signal is generated.

BACKGROUND ART

FIG. 1 is a pictographic representation of motion video in the form of a sequence of still frames. Moving images are typically composed of still images, such as these frames 1. For animation, sequences of these frames are presented at a typical speed of 15–100 frames per second, creating an illusion of continuous motion. When these moving images are captured as digital data in order to apply complex compression techniques, the frames are normally represented as a two-dimensional array of "pixels" 5. For the purposes of many compression techniques, pixels are organized into sequences. For example, pixels on the same row within a single frame 1 are organized into a horizontal sequence of pixels 7, pixels on the same column within a single frame are organized into a vertical sequence of pixels 6, and pixels within consecutive frames are organized into a time-varying sequence of pixels FIG. 2 is a graphical view of a conventional sequence 9 of pixels, which may occur in space, as a horizontal or vertical pixel sequence, or in time, as a time-varying pixel sequence.

FIG. 3 is a graphical view of a transformed equivalent representation 10, with some desirable property, in transform space, resulting from an application of a transform as the first step in a conventional "lossy" compression technique to the pixel sequence 9 of FIG. 2. This representation 10 is subsequently quantized according to some criterion, reducing its resolution, and the resulting quantized representation is encoded into its compressed form. On decompression, the quantized representation is recovered, and an inverse transformation is applied to the representation to recover its representation in time and space, instead of in transform space.

FIGS. 4A, 4B, and 4C show, respectively, the inverse transform of first, second, and third components of the equivalent representation 10 of FIG. 3. These components are pixel sequences occurring in the horizontal, vertical, and temporal dimensions.

The transformed equivalent representation 10 is a signal having continuously varying levels. The process of quantization changes each representation 10 to a signal having a number of discrete levels. For effective video compression, i.e. to maximize the compression ratio, the number of different levels should be minimized. However, if the number of levels is reduced too much, a video sequence resulting from compression and subsequent decompression of video data is noticeably changed from its original form. Thus, what is needed is a way to evaluate the effects of quantization and subsequent dequantization of signals in transform space to determine the minimum number of levels which can be used in quantization without effecting the way video sequences are perceived.

SUMMARY OF THE INVENTION

According to a first aspect of the present invention, there is provided apparatus for displaying effects of variations in the level of an input signal on video generated from said input signal. The apparatus includes an input circuit for providing the input signal, a first and second scaling circuits, first and second video generators, and first and second display screens. The first scaling circuit provides a first intermediate signal by scaling the input signal in accordance with a first constant value, while the second scaling circuit provides a second intermediate signal by scaling the input signal in accordance with a second constant value. The first display screen is driven by the first stream of video data to form a first visible image, while the second display screen is driven by the second stream of video data to form a second visible image. The two display screens are preferably placed adjacent to one another, so that an individual using the apparatus can easily view both display screens to determine whether a visible difference exists between the images formed thereon.

The apparatus of the present invention preferably emulates a portion of video system including compression of video data, with the transformation of the video data into a matrix of data in transform space, quantization of the data in transform space, and subsequent decompression of the data with dequantization and processing through a inverse transform to return a video signal, which drives a video display. Thus, in the apparatus of the present invention, the input signal is preferably a signal representing a single element of a data matrix in transform space, which is set to a value of one, while all other elements of the matrix data are set to a value of zero. After the input signal is quantized to first and second levels, the resulting signals are separately processed through an inverse transform for conversion into video data.

In one version of the present invention, the inverse transform is three-dimensional, so that a matrix of data in transform space is changed into data representing a number of video frames in horizontal, vertical, and temporal dimensions. Two versions of a block of frames, differing only in the scaling factor applied to the input signal, are repeatably viewed in the two screens. When the user of the system determines whether there is a visible difference between the block of frames, he presses a button to indicate his choice, which is stored as one of the blocks is changed to provide a new comparison. Alternately, the inverse transform is two-dimensional, so that a matrix of data in transform space is changed into data representing a single video frame in horizontal and vertical dimensions.

BRIEF DESCRIPTION OF THE FIGURES

FIG. 1 is a pictographic representation of motion video in the form of a sequence of still frames;

FIG. 2 is a graphical view of a conventional sequence of pixels;

FIG. 3 is a graphical view of a transformed equivalent representation in transform space;

FIGS. 4A, 4B, and 4C show, respectively the inverse transform of first, second, and third components of the equivalent representation of FIG. 3;

DESCRIPTION OF THE INVENTION

Apparatus built according to the present invention provides for the simultaneous display of two video images. The images are formed using the same input data, in the form of a matrix of data in transform space, but this input data for each of the two images is multiplied by a different visibility constant. A human subject viewing the two video images determines whether there is a perceptible difference between them. If there is no perceptible difference, the corresponding data in transform space, at two different levels of visibility constants, can be placed within the same level of quantization. If there is a perceptible difference, this difference can be maintained by placing the corresponding data in transform space within different levels of quantization.

Figure 5:
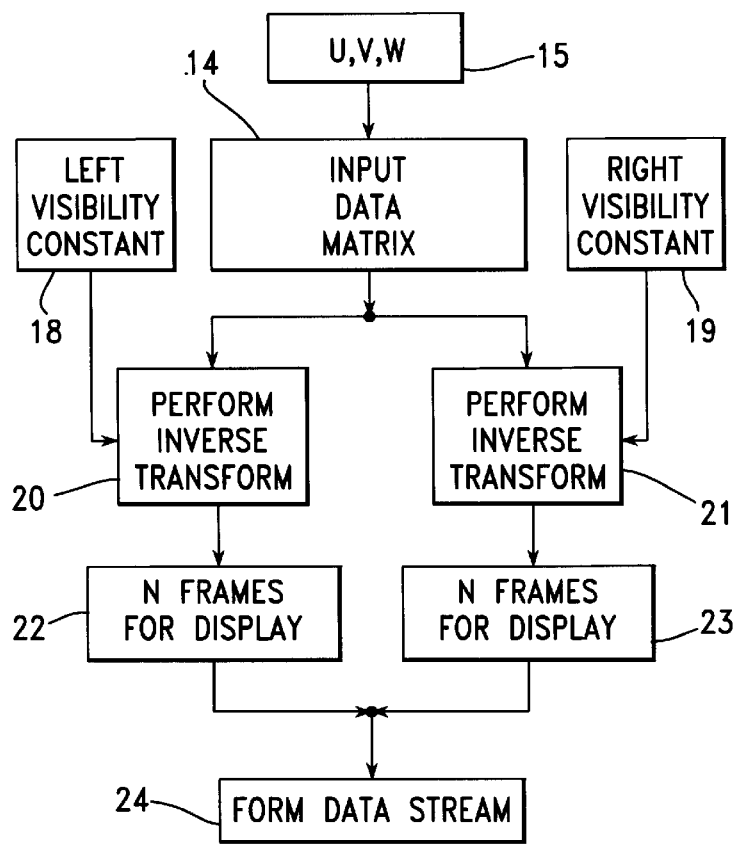
FIG. 5 is a block diagram of processes occurring within apparatus built according to the present invention to form a single stream of data including frames destined for each of two display screens.

FIG. 5 is a block diagram of processes occurring within apparatus built according to the present invention to form a single stream of data including frames destined for each of two display screens. These processes begin with a three-dimensional input data matrix 14, which represents data in a three-dimensional transform space. In general, a data matrix of this type includes a number of elements having various values, providing a representation of data which can be transformed into a block of video frames including motion. In the example of the present invention, each of the elements of the input data matrix 14 has a value of zero, except for the element specified by coordinates (U, V, W) 15. This element has a value of one. In this way, the effect of variations in the level of visibility of each of the matrix elements can be examined in a series of tests. Also provided are a left visibility constant 18, which determines a level of the matrix element used to generate data for display on a left screen, and a right visibility constant 19, which determines a level of the matrix element used to generate data for simultaneous display on a right screen.

The input data matrix 14 is simultaneously provided to a pair of inverse transform operations occurring in blocks 20, 21. In block 20, the non-zero element from input data matrix 14 is scaled according to the left visibility constant 18, and the inverse transform is performed to produce a number of video frames 22 for display on a left screen. Similarly, in block 21, the non-zero element from input data stream matrix 14 is scaled according to the right visibility constant 19, and the inverse transform is performed to produce a number of video frames 23 for display on a right screen. Then, in block 24, the individual video frames 22 and 23 are placed together in an alternating fashion within a single data stream. As video frames are placed sequentially into the data stream, an effect of movement or "animation" is developed.

Figure 6:
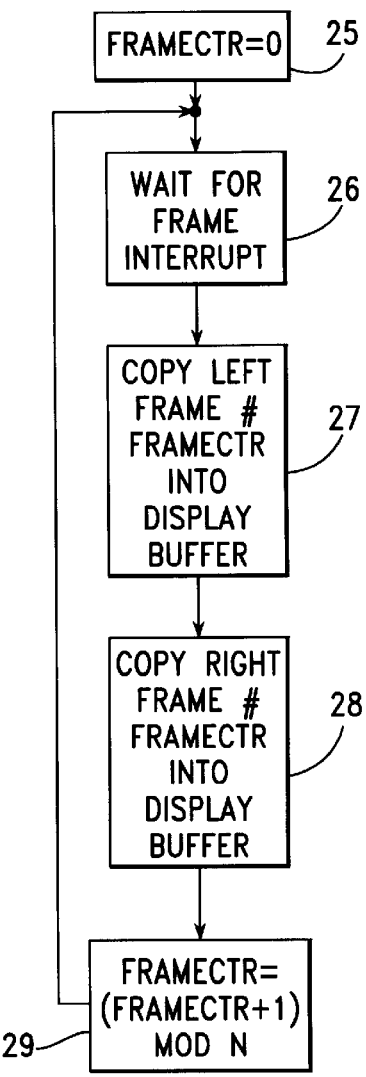
FIG. 6 is a flow chart of processes occurring as the stream of data formed in the processes of FIG. 5 is fed into a display buffer.

FIG. 6 is a flow chart of processes occurring as the data stream formed in block 24 (of FIG. 6) is fed into a display buffer. These processes animate frames on a display device by synchronizing the display of each frame at the start of a vertical blanking interval. A variable named "FrameCtr" is initialized in block 25 to index the first frame of a series of N frames. The value of N is the number of frames which can be formed using the input data matrix 14.

After "FrameCtr" is initialized in block 23, the system waits in block 26 until a vertical blanking interrupt is received, indicating an interval in which a copy of frame data can be inserted into the display buffer of the system without causing the display of objectionable artifacts. Furthermore, the interval between vertical blanking interrupts is used to determine which frame is to be displayed. Preferably, the time scale of the time-varying dimension of the transform associated with the input data matrix 14 and the inverse transform of blocks 20 and 21 (all shown in FIG. 5) is equal to the time between vertical blanking interrupts. When the vertical blank interrupt occurs, as indicated in block 26, the left frame associated with the value of the variable "FrameCtr" is copied into a first portion of the display buffer in block 27 and the right frame associated with the value of the variable "FrameCtr" is copied into a second portion of the display buffer in block 28. Then, in block 29, the value of "FrameCtr" is incremented by one, counting in a modulo N system, so that this value is returned to zero after it reaches the value N. In this way, the presentation of N frames is repeated as long as necessary.

Figure 7:
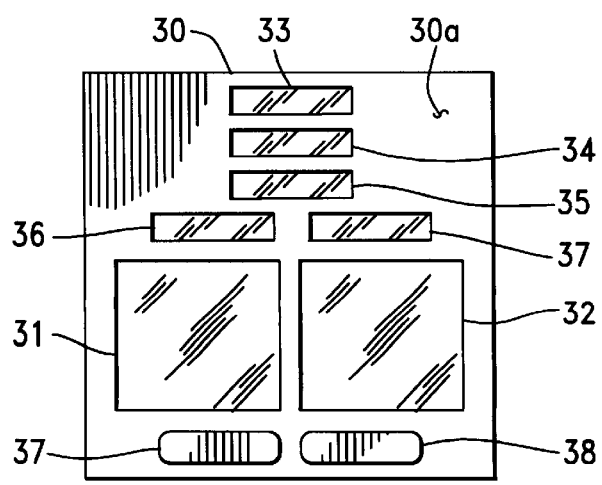
FIG. 7 is a front elevation view of a display device built in accordance with the present invention, having a front panel providing a user interface.

FIG. 7 is a front elevational view of a display device 30 built in accordance with the present invention, having a front panel 30a providing a user interface. The front panel 30a includes a left display screen 31 and a right display screen 32. The left display screen 31 is driven according to the contents of the first portion of the display buffer, into which a sequence of left frames are copied in block 27, as described above in reference to FIG. 6, while the right display screen 32 is driven according to the contents of the second portion of the display buffer, into which a sequence of right frames are copied in block 28, also as described above in reference to FIG. 6. The front panel 30a also includes a number of windows in which the various numerical parameters described above in reference to FIG. 5 are displayed. The coordinates of the non-zero elements of the data input matrix 14 are displayed in this manner, with U being displayed in window 33, with V being displayed in window 34, and with W being displayed in window 35. The left visibility constant 18 is displayed in window 36, and the right visibility constant 19 is displayed in window 37. Means are also provided for the user to indicate his response to the video images being displayed, with a first button 38 being used to indicate that the video images on the two screens 31,32 appear to be different, and with a second button 39a being used to indicate that the video images on the two screens 31, 32 appear to be the same.

Figure 8:
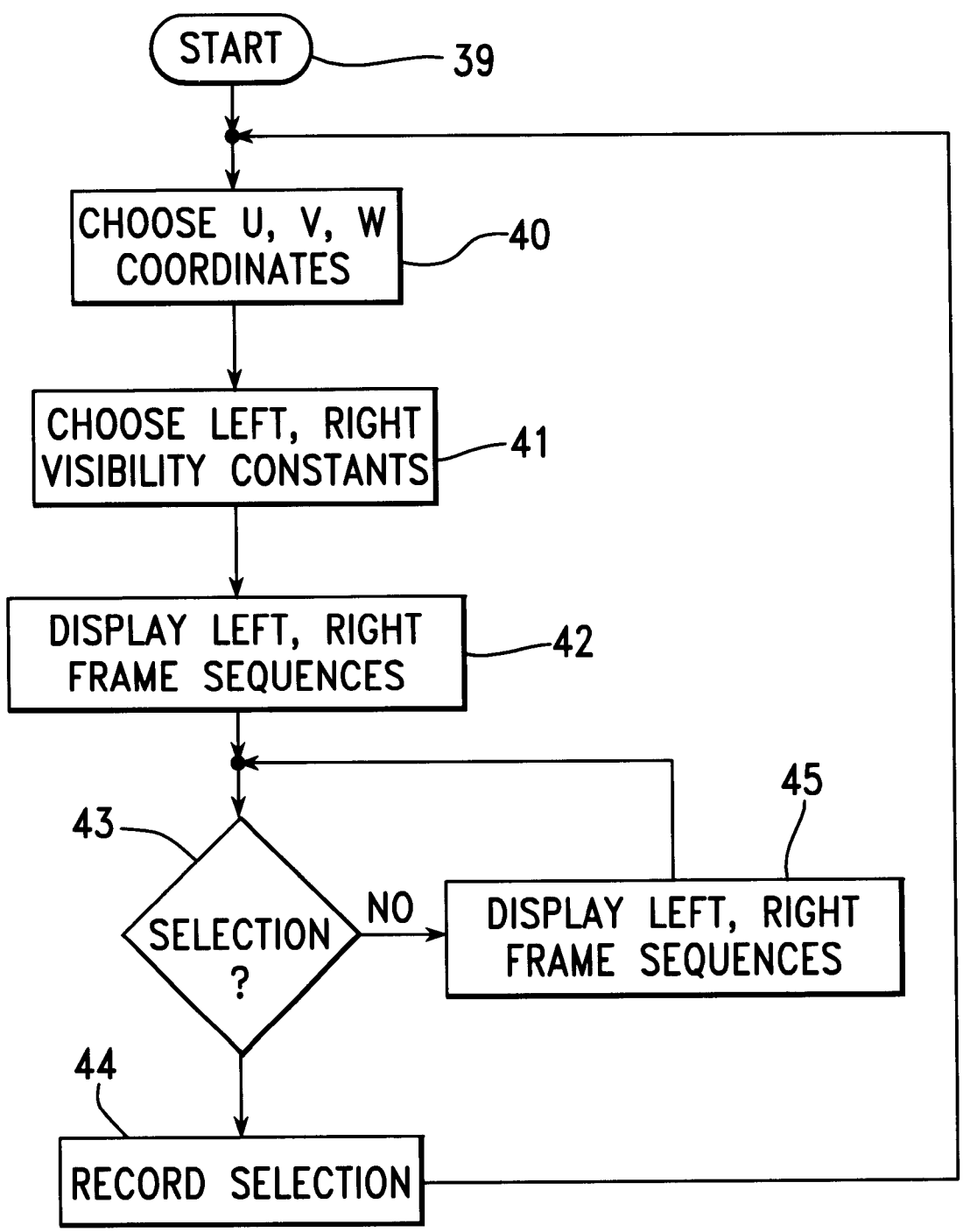
FIG. 8 is a flow chart of processes occurring during the operation of the display device of FIG. 7.

FIG. 8 is a flow chart showing operation of the display device 30 (of FIG. 7) in accordance with the present invention. This operation may, for example, occur under the control of code executing on a programmable device supporting the display device 30.

Referring to FIGS. 5, 7, and 8, after the process of FIG. 8 is begun in block 39, a choice is made, in block 40, of the U, V, W coordinates 15 of the non-zero element within the input data matrix 14. Next, in block 41, a choice is made of the left and right visibility constants 18, 19. Next, in block 42, frame sequences are constructed and displayed on left display screen 31 and right screen 32, in the manner previously described in detail in reference to FIGS. 5–7. Then, in block 43, the system determines whether a selection has been made by the user, as indicated by the depression of either button 37 or 38. Until a selection is made, the system repeatedly constructs and displays, in block 45, the left and right frame sequences formed in accordance with the coordinates and constants previously set in blocks 40,41. When the user makes a selection, as determined in block 43, the system stores the results of the selection in block 44, and returns to block 40, where the process of choosing new coordinates and/or visibility constants is begun. This process may be carried out by varying parameters in accordance with a predetermined sequence.

While the above description is specifically directed at a process for making comparisons of values of parameters being transformed by a three-dimensional inverse transform, to provide both spatial video data corresponding to horizontal and vertical dimensions on a display screen and temporal data corresponding to changes among frames within a block of frames, the apparatus and process of the present invention are also applied within the scope of the present invention for making comparisons of values of parameters being transformed by a two-dimensional inverse transform to provide spacial video data for a single frame, corresponding to horizontal and vertical dimensions on a display screen. When such comparisons are to be made, the apparatus operates generally as described above in reference to FIGS. 5 and 6, with the number of frames N in a block being set to one. Thus, the two-dimensional inverse transform functions in blocks 20 and 21 each result in a single left frame of data 22 and a single frame of data 23 being constructed for alternate insertion into the data stream in block 24. In block 27, the left single frame 22 is copied into the first portion of the display buffer, while in block 28, the right single frame 23 is copied into the second portion of the display buffer.

Furthermore, the method of the present invention may be used to compare the effects of changes in parameter which is subsequently transformed, for example, through a one- or four-dimensional inverse transform, a stationary transform, or a color transform.

Thus, the present invention provides a reliable, economical method for visual sensitivity measurement, which may be used by a subject with or without supervision. This method may be used to improve the performance of transformation-based compression techniques, using the rationale that different levels of parameters which do not produce a visible difference in the displayed video can be placed in the same quantization level. The present invention permits simple, reliable, and subjective measurement of complex and critical time-varying data. An extremely simple interface is provided for use by the subject, so that it is particularly easy and economical to administer the process. A rapid and inexpensive method is provided for measuring quantizers used within a wide variety of video compression algorithms, with finer measurement of non-linear quantizers being enabled to facilitate the development of optimum video compression algorithms.

While the present invention has been described in its preferred version or embodiment with some degree of particularity, it is understood that this description is intended as an example only, and that numerous changes in the composition and arrangement of apparatus elements and process steps may be made within the scope and spirit of the invention.

What is claimed is:

1. Apparatus for displaying effects of variations in the level of an input signal on video generated from said input signal, wherein said apparatus comprises:
    input means for providing said input signal;
    first scaling means for providing a first intermediate signal by scaling said input signal in accordance with a first constant value;
    second scaling means for providing a second intermediate signal by scaling said input signal in accordance with a second constant value;
    a first video generator generating a first stream of video data from said first intermediate signal;
    a second video generator generating a second stream of video data from said second intermediate signal;
    a first display screen driven by said first stream of video data to form a first visible image; and
    a second display screen, adjacent said first display screen, driven by said second stream of video data to form a second visible image.

2. The apparatus of claim 1, wherein
each said video generator performs an inverse transform on individual parameters within a plurality of thereof, and
said input signal represents an individual parameter within said plurality thereof.

3. The apparatus of claim 2, wherein
said first video generator generates a first plurality of consecutive frames of video data from said first intermediate signal,
said second video generator generates a second plurality of consecutive frames of video data from said second intermediate signal,
said first display screen repeatably displays said first plurality of consecutive frames of video data, and
said second display screen repeatably displays said second plurality of consecutive frames of video data.

4. The apparatus of claim 3, wherein
said apparatus additionally includes first display buffer space, in which data representing said first plurality of consecutive frames of video data is consecutively stored, and second display buffer space, in which data representing said second plurality of consecutive frames of video data is consecutively stored,
said first display screen is driven to form said first visible image in response to data stored within said first display buffer space, and
said second display screen is driven to form said second visible image in response to data stored within said second display buffer space.

5. The apparatus of claim 4, additionally comprising:
data formatting means for alternately placing video data representing sequentially generated frames within said first plurality thereof and video data representing sequentially generated frames within said second plurality thereof in a data stream; and
data distribution means placing video data representing sequential frames alternately within said first display buffer space and said second display buffer space.

6. The apparatus of claim 4, additionally comprising:
data formatting means for alternately placing sequentially generated video data representing said first individual frame and sequentially generated video data representing said second individual frame in a data stream; and
data distribution means placing video data representing sequential frames alternately within said first display buffer space and said second display buffer space.

7. The apparatus of claim 3, wherein
said apparatus additionally includes first display buffer space, in which data representing said first individual frame of video data is stored, and second display buffer space, in which data representing said second individual frame of video data is stored,
said first display screen is driven to form said first visible image in response to data stored within said first display buffer space, and
said second display screen is driven to form said second visible image in response to data stored within said second display buffer space.

8. The apparatus of claim 2, wherein said input means sequentially selects individual parameters within said plurality thereof for representation by said input signal.

9. The apparatus of claim 2, additionally comprising:

a pair of switches for indicating subjective determinations based on observation of said display screens;

sequential control means for varying said first constant value in response to operation of a switch in said pair thereof; and storage means for storing data indicating which switch in said pair thereof is operated and said first constant value.

10. The apparatus of claim 2, wherein said apparatus additionally comprises a pair of switches for indicating subjective determinations based on observation of said display screens and sequential control means for varying said first and second constant values and for selecting a parameter within said plurality thereof in response to operation of a switch in said pair thereof, and said input means sequentially selects individual parameters within said plurality thereof, for representation by said input signal, in response to said sequential control means.

11. The apparatus of claim 2, wherein said first video generator generates a first individual frame of video data from said first intermediate signal, said second video generator generates a second individual frame of video data from said second intermediate signal, said first display screen repeatably displays said first individual frame of video data, and said second display screen repeatably displays said second individual frame of video data.

12. A method for displaying effects of variations in levels of parameters within a matrix of transformed video data on video images generated from said matrix of transformed video data, wherein said method comprises steps of:

a) generating an input signal representing an individual parameter within said matrix thereof;

b) scaling said input signal in accordance with a first constant value to form a first intermediate signal;

c) scaling said input signal in accordance with a second constant value to form a second intermediate signal;

d) generating a first stream of video data from said first intermediate signal;

e) generating a second stream of video data from said second intermediate signal;

f) displaying said first stream of video data on a first display screen;

g) displaying said second stream of video data on a second display screen; and h) varying a choice of said individual parameter within said matrix thereof and of said first and constant value in accordance with a step in a predetermined sequence, and repeating steps a) through g).

13. The method of claim 12, wherein steps f) and g) are continued until depression of either a first or second switch, and said method additionally includes a step of storing data indicating which of said first and second switches is depressed.

14. The method of claim 12, wherein step d) includes generating a first plurality of consecutive frames of video data from said first intermediate signal;

step e) includes generating a second plurality of consecutive frames of video data from said second intermediate signal;

step f) includes repeatedly displaying said first plurality of consecutive frames of video data; and step g) includes repeatedly displaying said second plurality of consecutive frames of video data.

15. The method of claim 14, comprising additionally, between steps e) and f), steps of:

storing data representing said first plurality of consecutive frames of video data in a first display buffer space;

storing data representing said second plurality of consecutive frames of video data in a second display buffer space;

reading data from said first display space to drive said first display screen; and reading data from said second display space to drive said second display screen.

16. The method of claim 15, comprising additionally, between steps e) and f) steps of:

forming a data stream having data from consecutive individual frames within said first plurality of thereof in a sequence alternating with data from consecutive individual frames within said second plurality thereof;

storing data representing alternating frames within said data stream in first and second display buffer spaces;

reading data from said first display space to drive said first display screen; and reading data from said second display space to drive said second display screen.

17. The method of claim 12, wherein step d) includes generating a first individual frame of video data from said first intermediate signal, step e) includes generating a second individual frame of video data from said second intermediate signal, step f) includes repeatedly displaying said first individual frame, and step g) includes repeatedly displaying said second individual frame.

* * * * *